Sept. 20, 1955 F. F. KISHLINE ET AL 2,718,409
FRAME STRUCTURE FOR WHEEL SUPPORT
Filed Dec. 4, 1953 2 Sheets-Sheet 1

INVENTOR.
FLOYD F. KISHLINE
JOHNSTON STUART VOIGT
BY
Carl J. Barbee
ATTORNEY

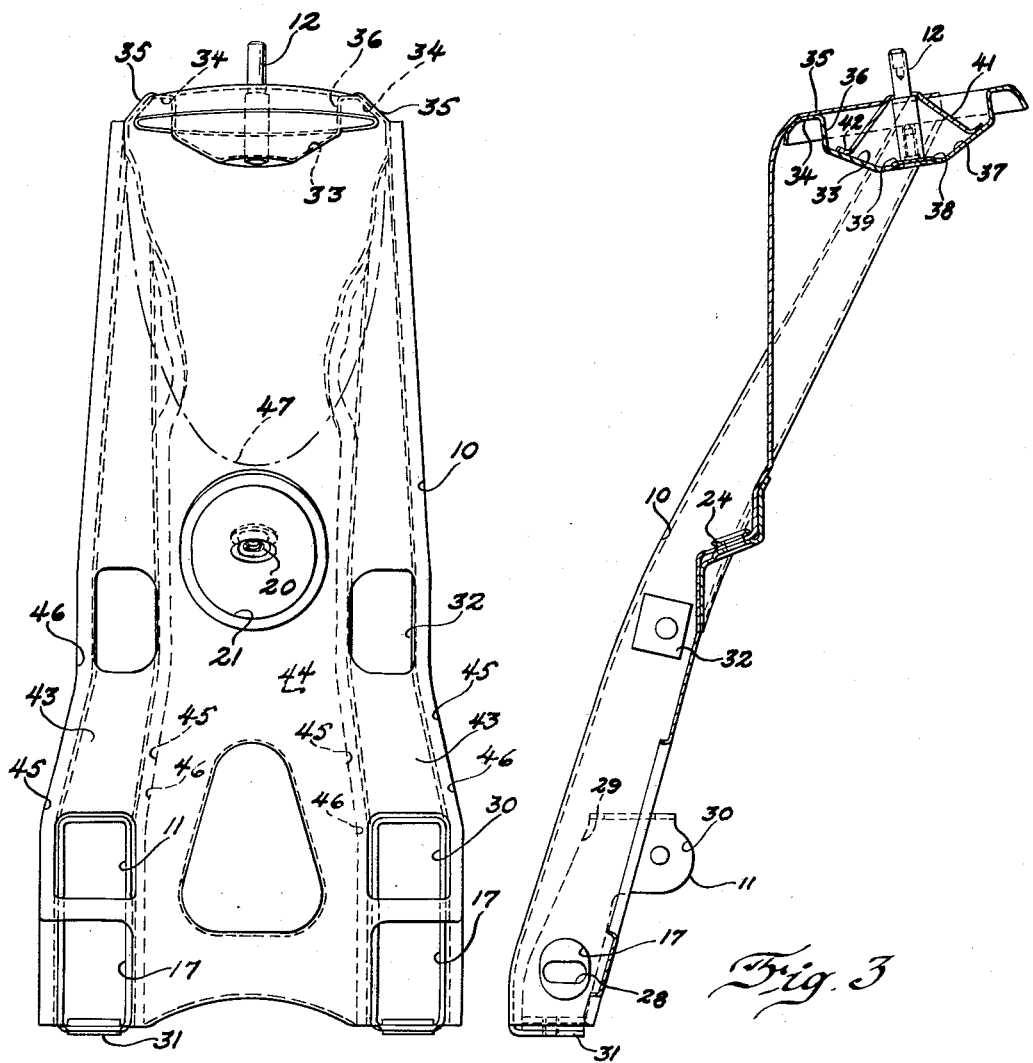

United States Patent Office

2,718,409
Patented Sept. 20, 1955

2,718,409

FRAME STRUCTURE FOR WHEEL SUPPORT

Floyd F. Kishline and Johnston Stuart Voigt, Kenosha, Wis., assignors to American Motors Corporation, a corporation of Maryland Application December 4, 1953, Serial No. 396,194

4 Claims. (Cl. 280—106)

This invention relates generally to motor vehicles and it has particular relation to an individual wheel suspension arrangement for wheels of said vehicle.

One object of the invention is to provide a generally improved suspension system which is less costly than other suspension systems now in use.

In general it may be mentioned that a conventional type of individual wheel suspension is to provide means for suspending a vehicle body relative to one of its wheels wherein the suspension assembly is secured directly to a portion of the vehicle body. In this general arrangement the wheel housing is comprised of two sheet metal stampings welded together at various points to form a rigid housing structure and a third metal stamping providing additional rigidity to the wheel housing in the region where the usual control arms are secured to the wheel housing. This general arrangement provides space for mounting one end of the usual king pin and the upper end of a shock absorber in addition to mounting the control arms. In place of the wheel housing construction, above, we provide a single bracket structure of such strong construction wherein all the above members can be assembled with less cost, time, and effort, and which in addition, provides a new and novel arrangement for caster and camber adjustment of the wheel relative to the vehicle body which are believed to be improvements in the art.

Another object of this invention is to provide a so-called packaged unit which is separable from the usual form of wheel housing but when bolted to a portion of the vehicle body readily forms the important part of the wheel housing. This packaged unit has as its basic construction a large bracket or support of such size as to support one end of a king pin, a shock absorber and control arms, and, in addition, is itself insulated from the vehicle body through insulating rubber members which absorb body vibrations and noises which cannot be transmitted to the packaged unit. This packaged unit is or can be a bench assembly where the previously assembled whole unit is bolted to the vehicle body during the assembling of the vehicle.

A further object of the invention is to provide improved constructions for the purposes mentioned in the preceding objects, which are simple and comparatively inexpensive to manufacture, assemble, and to adjust.

Other objects of the invention will become apparent from the following specification, from the drawings pertaining thereto, and from the claims hereinafter set forth.

Figure 2 is a front plan view of the invention.

Figure 3 is a side view of the invention as disclosed in Figure 2.

Figure 1:
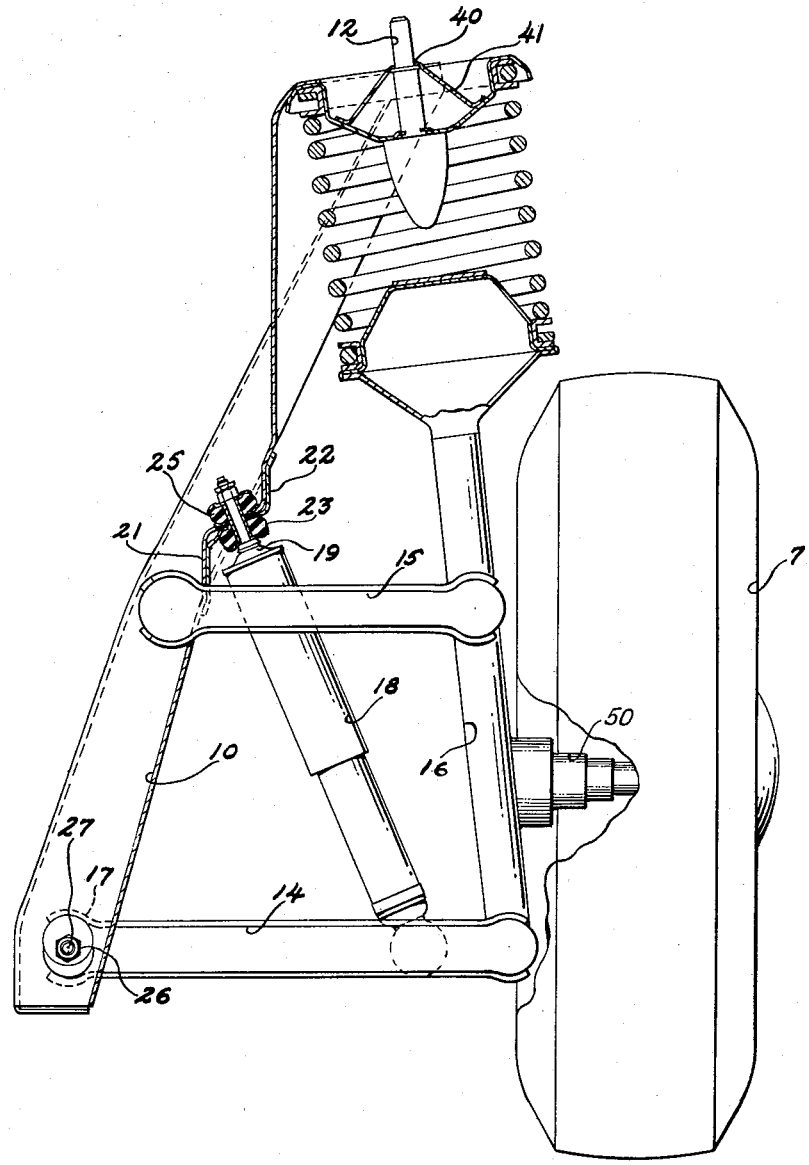
Figure 1 is a plan view of an automotive vehicle showing the approximate position of the invention in such vehicle.

In previous applications it has been the practice to hang a vehicle wheel suspension assembly directly from the vehicle body. This type of suspension and application has proved to be excellent in operation and has generally improved the actual operation of the vehicle. In the present invention the applicants have utilized much of the above method of suspension, but, in addition, have instituted a so-called packaged unit which comprises as its main support a large bracket member which is bolted to the sill of a vehicle at its lower end and supported or pinned in the wheel housing at its upper end.

The vehicle body is made up generally of sheet metal members which are secured to a frame portion or sill providing a "unitized" body and frame structure. At the forward end of the automotive vehicle a portion of the body is formed in the manner of a wheel housing which housing is ultimately completely covered by a hood and the front fender, said wheel housing substantially embracing one of the front wheels 7. One side of the wheel housing forms a side wall of the engine compartment. The wheel housing is comprised of a well known sheet metal stamping. Our invention is directed to a bracket 10 which may be bolted to vehicle sill 11 at its lower end and mounted at its upper end by an upwardly projecting pin 12 which may be pushed into the usual opening provided in a wheel housing.

The control arms 14 and 15 are of well known construction with one end of arm 14 connected to king pin 16 and the other end connected to the lower part of bracket at 17. The other control arm 15, which is the upper arm, is also connected at its ends to said king pin 16 and said bracket 10 remote from the connecting points of control arm 14. The king pin 16 is connected to wheel 7 by assembly 50.

A shock absorber 18 is pivotally mounted at its lower end to control arm 14. The upper end of the shock absorber may have a stem portion 19 which protrudes through an enlarged opening 20 provided in boss 21 formed in approximately the center of said bracket. This boss 21 is reenforced by a plate 22 which is also apertured and in line with said opening 20 with said plate being secured to said bracket by any suitable fastening means, which in this particular instance is by spot-welding. The plate is dish-shaped adjacent said aperture and receives a rubber washer 23 which nests within said dish-shaped portion. A dish-shaped shock absorber grommet retainer plate 24 is secured to said bracket adjacent said opening and also receives a rubber washer 25 which nests within the dish-shaped portion. More specifically, the stem passes through said washers and is secured to said bracket. The rubber washers provide a cushion between said stem 19 and bracket 10 whereby to eliminate any undue body noises.

Caster and camber adjustments of the wheel relative to the wheel body (which adjustments are common in the art) are affected by the loosening of nuts 26 and moving the bolt 27 within the groove 28, see Fig. 3, provided in the bracket 10 to which arm 14 is connected.

A reenforcing front suspension mounting bracket 29 is secured to said bracket by spot-welding and includes a block 30 through which said bracket 10 may be secured to the sill of an automobile. Spaced front suspension mounting bracket plates 31 are secured to the bottom of said bracket.

The part of the bracket which receives and secures the control arm 15 comprises a front suspension mounting bracket plate 32 which is held or secured to said bracket by spot-welding at various points.

The projecting pin 12 holding the upper section of said bracket comprises an enlarged circular plate 33 having a substantial part of its edge 34 folded over and secured at various points to the top section 35 of said bracket 10. This plate is of substantial depth having initially a steep wall 36 and then a gradually sloping wall 37 terminating in a flat bottom 38. This flat bottom is upset in the center and contains an opening 39 through which said pin 12 is projected. This pin is provided with a flat head, the bottom of which bears against the area adjacent said opening 39. The pin is reduced in diameter intermediate its free end to provide a shoulder 40 for engagement by the apex of a cone-shaped stamping 41. The bottom edge of said stamping is bent to provide a flange 42 of substantial width which is held securely to the sloping wall 37. Each end of said pin is bored and threaded and when mounted in position on a vehicle provides space to receive the fastening elements for securing the upper part of said bracket to said vehicle.

It will be noted that the body of the bracket comprises a pair of channel portions 43 which are joined together by a web portion 44. The walls 45 of each channel 43 are substantially spaced from each other to provide space for an end of each control arm 14 and 15 as previously referred to and also the member 37 for securing the bracket 10 to a sill. Each channel 43 is substantially U-shaped throughout the major part of its length but the walls do converge toward each other at its top point. The ends 46 of the walls are bent outwardly at right angles to provide flanges 46 whereby said flanges are spot-welded along their entire length to said web 44.

The web 44 may be stamped out of a single piece of sheet metal and is provided with the boss or raised portion 21 previously referred to and having a second raised portion 47 having a pair of sides forming the apex of a V immediately adjacent said boss with spaced sides extending gradually outwardly therefrom. The distance from each side increases gradually from said apex with the free ends terminating at the limit of the converging ends of the walls 45 whereupon said web is bent inwardly to form the support for the shock absorber reenforcement plate.

It is believed that the construction, manipulation, utility and advantages of this invention will now be clearly apparent to those skilled in this art without a more detailed description thereof.

The possible embodiment of the invention has been described in considerable detail merely for the purposes of exemplification since in actual practice it attains the features of the invention and the above description.

It will be apparent that changes in the details of construction, and in the combination and arrangements of parts may be resorted to without departing from the spirit or scope of the invention as hereinafter claimed or sacrificing any of its advantages.

What is claimed is:

1. The combination of a suspension device including a sheet metal plate and a pair of oppositely spaced channel members secured adjacent opposite sides of said plate, said plate provided with an apertured boss intermediate its ends, a reenforcement member secured adjacent said boss and provided with an aperture in line with said aperture in said boss, opposite sides of said boss and reenforcement member are cup-shaped, adjacent said apertures wherein spaced grommets are secured, said channel members provided with oppositely disposed apertures to receive a member to effect caster and camber adjustment.

2. The combination of a suspension device including a sheet metal plate and a pair of oppositely spaced channel members secured adjacent opposite sides of said plate, said device having a cup-shaped reenforcement member secured at its top for engagement with a wheel housing and an apertured boss intermediate its ends for mounting one end of a shock absorber, said channel members provided with pairs of oppositely spaced apertures, one pair having means for mounting said device to the sill of a vehicle, other pairs for mounting support arms.

3. The combination of a suspension device including a sheet metal plate and a pair of oppositely spaced channel members secured adjacent opposite sides of said plate, said device having a cup-shaped reenforcement member secured at its top for engagement with a wheel housing and a reenforced apertured boss member intermediate its ends for mounting one end of a shock absorber, said channel members provided with pairs of oppositely spaced enlarged apertures, a bracket arranged in one pair of said oppositely spaced apertures for mounting said device to vehicle sills, the lower end of each last named bracket having an elongated aperture for mounting caster and camber adjustment means and mounting lower control arms, another pair of said apertures arranged to mount upper control arms.

4. The combination of a suspension device including a sheet metal plate and a pair of oppositely spaced channel members secured adjacent opposite sides of said plate, similar sides of each channel member converging into a common apertured boss, a reenforcement member arranged on one side of said boss and having an aperture aligned with said aperture in said boss, a grommet nesting in said boss and a reenforcement member providing insulation for a shock absorber having one end mounted therein, said plate above said boss formed gradually in a dish-shape with a reenforcement cup-shaped member secured to and projecting outwardly from said top of said plate, said last named cup-member having a pin projecting outwardly for engagement with a wheel housing, said channel members provided with pairs of oppositely spaced enlarged apertures, a bracket arranged in one pair of said oppositely spaced apertures for mounting said device to vehicle sills, the lower end of each last named bracket having an elongated aperture for mounting caster and camber adjustment means and mounting lower control arms, another pair of said apertures arranged to mount upper control arms.

References Cited in the file of this patent

UNITED STATES PATENTS

| 2,299,926 | Phelps | Oct. 27, 1942 |
| 2,455,429 | Lucien | Dec. 7, 1948 |
| 2,631,681 | Utz et al. | Mar. 17, 1953 |

FOREIGN PATENTS

| 407,458 | Italy | Oct. 13, 1944 |